(12) United States Patent
Guha et al.

(10) Patent No.: US 10,880,472 B1
(45) Date of Patent: Dec. 29, 2020

(54) SMART SENSOR MEASUREMENT SYSTEM

(71) Applicant: Air Products and Chemicals, Inc., Allentown, PA (US)

(72) Inventors: Avishek Guha, Breinigsville, PA (US); Erdem Arslan, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 48 days.

(21) Appl. No.: 16/438,655

(22) Filed: Jun. 12, 2019

(51) Int. Cl.
*H04N 5/232* (2006.01)
*H04N 5/33* (2006.01)
*G06T 7/00* (2017.01)

(52) U.S. Cl.
CPC ........... *H04N 5/23229* (2013.01); *G06T 7/97* (2017.01); *H04N 5/332* (2013.01); *G06T 2207/10048* (2013.01); *G06T 2207/20084* (2013.01)

(58) Field of Classification Search
CPC .... H04N 5/332; H04N 5/23229; H04N 7/181; G06T 7/97; G06T 2207/10048; G06T 2207/2084; G01J 5/0096; G01J 2005/0077
USPC .................................................. 382/103, 141
See application file for complete search history.

(56) References Cited

U.S. PATENT DOCUMENTS

| | | | |
|---|---|---|---|
| 8,374,438 B1* | 2/2013 | Wagner | G06T 7/001 382/209 |
| 10,613,003 B2* | 4/2020 | Luharuka | E21B 12/02 |
| 2014/0168433 A1* | 6/2014 | Frank | H04N 5/33 348/143 |
| 2018/0181830 A1* | 6/2018 | Luharuka | E21B 41/0021 |
| 2019/0310137 A1* | 10/2019 | Pop | H04N 7/181 |

* cited by examiner

*Primary Examiner* — Daniel G Mariam
(74) *Attorney, Agent, or Firm* — Matthew R. Weaver

(57) ABSTRACT

A first camera captures a first image of a scene, and a second camera captures a second image capturing thermal distribution across the scene. The first image is processed to detect one or more objects of interest in the scene and to identify respective surface characteristics of the objects. The first image is overlaid with the second image to identify regions of interest in the second image corresponding to the objects of interest in the first image. Values of pixels that belong to respective regions of interest in the second image are converted to temperature values using respective conversion functions that reflect respective emissivity values determined by the identified respective surface characteristics of the corresponding objects of interest in the first image. The temperature values are analyzed to monitor thermal conditions of the one or more objects of interest in the scene.

20 Claims, 5 Drawing Sheets

SMART SENSOR MEASUREMENT SYSTEM

FIELD OF THE INVENTION

The present disclosure relates generally to sensor devices and, more particularly, to imaging sensor devices.

BACKGROUND

Remote sensor devices are typically positioned near target objects and are used to measure and/or monitor parameters of interest of the target objects. For example, an infrared (IR) camera sensor device may be positioned near a target object and may detect the infrared radiation emitted from the target object. The IR camera sensor device may convert the detected infrared radiation to temperature values to obtain a thermal distribution across the target object. Such sensor devices may be useful, for example, in a production or distribution pipeline network, such as a gas distribution pipeline network, where such sensor device may remotely monitor parameters of equipment (e.g., pipes, valves, motors, etc.) used in the production or distribution pipeline network. Generally, the amount of infrared energy emitted by an object at a particular temperature depends on the emissivity of the surface of the object. For example, shiny metal objects generally have relatively low emissivity and such objects are generally inefficient emitters of infrared energy. On the other hand, objects with non-shiny metal surfaces (e.g., painted metal surfaces, rusty metal surfaces, etc.) generally have relatively higher emissivity, and are generally more efficient emitters of infrared energy. Accordingly, a shiny metal object at a particular temperature will generally emit less infrared energy as compared to a painted metal object at the same particular temperature. Typical IR camera sensor devices operate by converting raw data obtained by the IR camera to temperature values using a predetermined conversion function that assumes a certain emissivity value that does not depend on particular surface conditions of the target object. Therefore, typical IR cameras perform temperature conversion to obtain a temperature value for the target object without taking into account the particular emissivity of the target object. As a result, typical IR camera sensor devices often produce temperature measurements that do not accurately reflect of the actual temperature of the target object.

BRIEF SUMMARY OF THE INVENTION

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely summarizes some of the concepts of the disclosure as a prelude to the more detailed description provided thereafter.

In an embodiment, a method for processing thermal image data in a sensor device includes processing, with a processor of the sensor device, a first image of a scene to detect one or more objects of interest in the scene, wherein detecting the one or more objects of interest includes identifying respective surface characteristics of the one or more objects of interest detected in the scene. The method also includes overlaying, with the processor of the sensor device, the first image of the scene with a second image of the scene, the second image capturing thermal distribution across the scene, to identify one or more regions of interest in the second image of the scene corresponding to the one or more objects of interest detected in the first image of the scene. The method additionally includes converting, with the processor of the sensor device, values of pixels in the one or more regions of interest identified in the second image of the scene to temperature values, including converting values of pixels that belong to respective regions of interest, among the one or more regions of interest in the second image of the scene, using respective conversion functions that reflect respective emissivity values of the one or more objects of interest detected in the first image scene, the emissivity values determined by the identified respective surface characteristics of the one or more objects of interest detected in the first image of the scene. The method also includes analyzing, with the processor of the sensor device, the temperature values to monitor thermal conditions of the one or more objects of interest in the scene.

In another embodiment, a sensor device comprises a first camera configured to capture a first image of a scene, a second camera configured to capture a second image of the scene, the second image capturing thermal distribution across the scene, and a processor coupled to the first camera and the second camera. The processor is configured to process the first image of the scene to detect one or more objects of interest in the scene, wherein detecting the one or more objects of interest includes identifying respective surface characteristics of the one or more objects of interest detected in the scene. The processor is also configured to overlay the first image of the scene with the second image of the scene to identify one or more regions of interest in the second image of the scene corresponding to the one or more objects of interest detected in the first image of the scene. The processor is additionally configured to convert values of pixels in the one or more regions of interest identified in the second image of the scene to temperature values, including converting values of pixels that belong to respective regions of interest, among the one or more regions of interest in the second image of the scene, using respective conversion functions that reflect respective emissivity values of the one or more objects of interest detected in the first image scene, the emissivity values determined by the identified respective surface characteristics of the one or more objects of interest detected in the first image of the scene. The processor is also configured to analyze the temperature values to monitor thermal conditions of the one or more objects of interest in the scene.

In yet another embodiment, a system comprises a server device application configured to process thermal data, and a sensor device coupled to the server device component via a communication network. The sensor device comprises a first camera configured to capture a first image of a scene, a second camera configured to capture a second image of the scene, and a processor coupled to the first camera and the second camera. The processor is configured to process the first image of the scene to detect one or more objects of interest in the scene, wherein detecting the one or more objects of interest includes identifying respective surface characteristics of the one or more objects of interest detected in the scene. The processor is also configured to overlay the first image of the scene with the second image of the scene to identify one or more regions of interest in the second image of the scene corresponding to the one or more objects of interest detected in the first image of the scene. The processor is additionally configured to convert values of pixels in the one or more regions of interest identified in the second image of the scene to temperature values, including converting values of pixels that belong to respective regions of interest, among the one or more regions of interest in the second image of the scene, using respective conversion functions that reflect respective emissivity values of the one or more objects of interest detected in the first image scene, the emissivity values determined by the identified respective surface characteristics of the one or more objects of interest detected in the first image of the scene. The processor is also configured to cause the temperature values to be transmitted via the communication network to the server device application for further processing.

Further scope of applicability of the apparatuses and methods of the present disclosure will become apparent from the more detailed description given below. It should be understood that the following detailed description and specific examples, while indicating embodiments of the apparatus and methods, are given by way of illustration only, since various changes and modifications within the spirit and scope of the concepts disclosed herein will become apparent to those skilled in the art from the following detailed description.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

Figure 1:
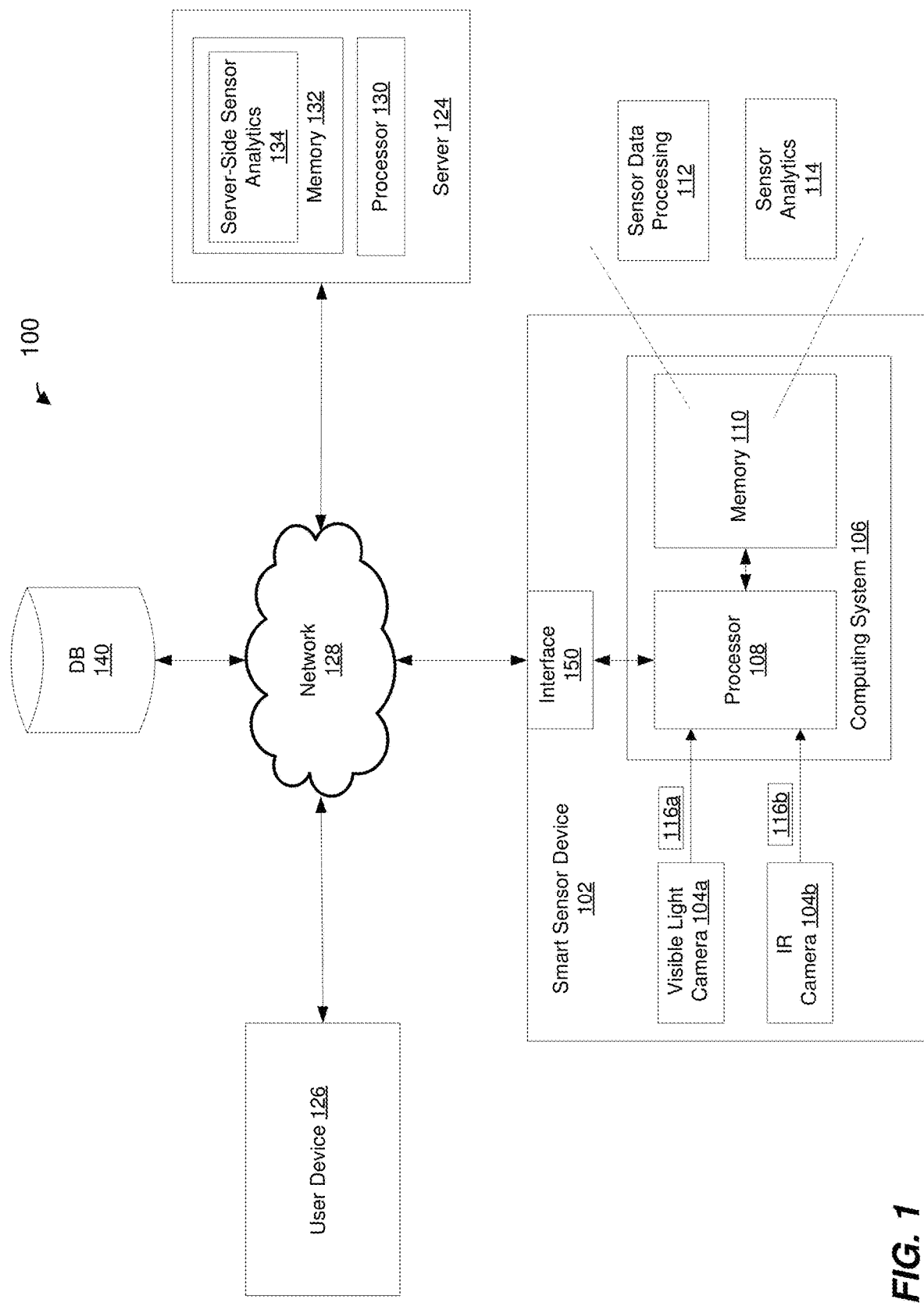
FIG. 1 is a block diagram of a system in which a sensor device may be utilized, according to an embodiment.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

In embodiments described below, a sensor device may capture images of a scene (e.g., a portion of a gas distribution pipeline network) and may monitor thermal conditions of one or more objects of interest (e.g., pipes, nuts, flanges, motors, etc.) that may be present in the scene. The sensor device may include a visible light camera configured to capture a visible image of the scene and an infrared (IR) camera configured to capture an IR image of the scene. The sensor device may process the visible image of the scene to detect the one or more objects of interest in the visible image of the scene. Detecting the one or more objects of interest in the visible image of the scene may include identifying respective surface characteristics of the one or more objects of interest in the scene. Based on the identified surface characteristics of the one or more objects of interest, the sensor device may determine respective emissivity values corresponding to the one or more objects of interest in the scene, or respective temperature conversion functions that reflect the respective emissivity values of the one or more objects in the scene.

The sensor device may overlay the visible image of the scene with the IR image of the scene to generate a composite image and to identify pixels in the IR image that correspond to the detected one or more objects in the visible image. The sensor device may convert pixel values of the identified pixels in the IR image to temperature values using the respective conversion functions that reflect the respective emissivity values of the one or more objects detected in the visible image. In at least some embodiments, converting pixel values of the identified pixels in the IR image to temperature values using the respective conversion functions that reflect the respective emissivity values of the one or more objects detected in the visible image allows the sensor device to provide accurate temperature measurements for the one or more objects of interest that take into account the respective emissivity values of the one or more objects of interest. Moreover, identifying specific pixels in the IR image corresponding to the one or more objects of interest detected in the visible image allows the sensor device to precisely isolate those pixels in the IR image that correspond to a particular object of interest detected in the visible image, further improving accuracy of temperature measurements provided by the sensor device, in at least some embodiments.

FIG. 1 is a block diagram of a system 100 in which imaging sensor techniques may be utilized, according to an embodiment. The system 100 may include a sensor device 102 (sometimes referred to herein as "smart sensor device") that may be configured to monitor thermal conditions of one or more objects of interest (e.g., pipes, nuts, flanges, motors, etc.) of a pipeline network, such as a gas pipeline network. Although merely for explanatory purposes the sensor device 102 is generally described herein as being utilized with a gas pipeline network, the sensor device 102 may be utilized to monitor thermal conditions of objects of interest in suitable environments other than a gas pipeline network in other embodiments. The smart sensor device 102 may include a plurality of sensors 104 coupled to a computing system 106. The computing system 106 is illustrated in FIG. 1 as including a processor 108 and a computer readable memory 110 that stores computer readable instructions executable by processor 108. Computer readable memory 110 may store a sensor data processing system 112 and a sensor analytics system 114. Computer readable memory 110 may include volatile memory to store computer instructions, such as Random Access Memory (RAM), and may also include persistent memory such as, for example, a hard disk, hard-drive or any other stable storage space, e.g. a secure digital ("SD") card of the smart sensor device 102, an external flash drive connected to the smart sensor device 102, etc. Although the computing system 106 is illustrated in FIG. 1 as including a single processor 108, the computing system 106 includes multiple processors 108 in other embodiments. Further, in some embodiments, the sensor data processing system 112 and/or the sensor analytics system 114 may be implemented using hardware components, firmware components, software components, or any combination thereof.

The plurality of sensors 104 may include a first camera 104a configured to capture first images 116a of a scene and a second camera 104b configured to capture second images 116b of the scene. The first camera 104a may be a visible light camera and the first images 116a may be visible images. The second camera 104b may be an IR camera and the second images 116b may be IR images. For ease of explanation, the first camera 104a is sometimes referred to herein as a "visible light camera" 104a and the first images 116a are sometimes referred to herein as "visible images" 116a. Similarly, for ease of explanation, the second camera 104b is sometimes referred to herein as an "IR camera" 104b and the second images 116b are sometimes referred to herein as "IR images" 116b. In other embodiments, however, other suitable types of cameras and corresponding other suitable types of images may be utilized.

The visible light camera 104a and the IR camera 104b may have at least substantially common fields of view. In an embodiment, to ensure that the visible light camera 104a and the IR camera 104b have at least substantially common fields of view, the visible light camera 104a and the IR camera 104b may be maintained on a same plane (e.g., mounted to a same plate), pointed in a same direction and positioned sufficiently close to each other relative to a distance from the one or more objects of interest in the scene. The scene captured by the visible light camera 104a and the IR camera 104b may be a scene in the common field of view of the visible light camera 104a and the IR camera 104b, or may be a scene in an overlapping portion of an at least substantially common field or view of the visible light camera 104a and the IR camera 104b, in various embodiments.

The visible image 116a captured by the visible light camera 104a and the IR image 116b captured by the IR camera 104b may be provided to the computing system 106. The sensor data processing system 112 of the computing system 106 may process the visible image 116a to detect one or more objects of interest in the visible image 116a. The one or more objects of interest detected in the visible image 116a may include, for example, one or more pipes or portions thereof, one or more valves or portions thereof, one or more motors or portions thereof, etc., in various embodiments. Detecting the one or more objects of interest in the visible image 116a may include identifying respective surface characteristics of the one or more objects of interest in scene. For example, detecting the one or more objects of interest in the visible image 116a may include identifying respective surface materials and/or conditions (e.g., metal, plastic, wood, shiny, rusted, painted, etc.) of the one or more objects of interest in the scene, in an embodiment. As an example, in an embodiment in which the one or more objects of interest in the scene include a pipe, detecting the pipe in the visible image 116a may include detecting the pipe as a painted metal pipe, a rusted metal pipe, a plastic pipe, etc.

With continued reference to FIG. 1, the sensor data processing system 112 may obtain, based on the respective surface characteristics of the one or more objects of interest detected in the visible image 116a, respective conversion functions for converting, to temperature values, values of pixels in regions of the IR image 116b that align with the corresponding objects of interest detected in the visible image 116a. The conversion function corresponding to a particular object of interest may reflect the emissivity of the particular object of interest as determined by the identified surface characteristics of the particular object of interest. In an embodiment, as will be described in more detail below, the sensor data processing system 112 may retrieve, from a memory (e.g., the memory 110 or another suitable memory), respective calibration files specifying respective conversion functions for the one or more objects of interest detected in the visible image 116a based on the identified surface characteristics of the object of interest detected in the visible image 116a. In other embodiments, the sensor data processing system 112 may obtain the respective conversion functions for the one or more objects of interest in other suitable manners.

The sensor data processing system 112 may overlay the visible image 116a with the IR image 116b to generate a composite image of the scene and to identify one or more regions of interest in the IR image 116b corresponding to the one or more objects of interest detected in the visible image 116a. For example, the sensor data processing system 112 may overlay the visible image 116a with the IR image 116b to align the visible image 116a with the IR image 116b and to determine a mapping between pixels that belong to the one or more objects of interest detected in the visible image 116a and corresponding pixels in the IR image 116b. Based on the mapping between pixels that belong to the one or more objects of interest detected in the visible image 116a and corresponding pixels in the IR image 116b, the sensor data processing system 112 may determine temperature distributions across the one or more objects of interest in the scene using the appropriate conversion functions obtained based on the identified surface characteristics of the one or more objects of interest. For example, the sensor data processing system 112 may determine temperature distributions across the one or more objects of interest in the scene by converting values of pixels in the identified one or more regions of interest in the IR image 116b to temperature values using the respective conversion functions specified in the calibration files retrieved from the memory (e.g., the memory 110 or the other suitable memory) based on surface characteristics of the corresponding one or more objects of interest detected in the visible image 116a, in an embodiment.

An example scene that may be monitored by the smart sensor device 102, according to an embodiment, is described in more detail below in connection with FIG. 2. An example embodiment of the sensor data processing system 112 is described in more detail below in connection with FIG. 3.

Referring still to FIG. 1, in an embodiment, the visible images 116a may be captured by the visible light camera 104a concurrently with the IR images 116b being captured by the IR camera 104b. However, in embodiments in which the scene being captured by the visible light camera 104a and the IR camera 104b is generally static, the concurrent capture of the visible image 116a and the IR image 116b is not necessary, and the visible images 116a and the IR images 116b may be captured at different times, in some embodiments. In an embodiment, for example, only a single visible image 116a is captured during operation of the smart sensor device 102, whereas IR images 116b are captured periodically (e.g., every 5 minutes, every 30 minutes, every hour, every day, etc.) throughout operation of the smart sensor device 102, to obtain thermal measurements for the one or more objects of interest throughout operation of the smart sensor device 102. In another embodiment, visible images 116*a* are also periodically captured throughout operation of the smart sensor device 102, however the visible images 116*a* are captured less frequently than the IR images 116*b*. For example, the visible images 116*a* may be captured periodically (e.g., every hour, every day, etc.) to ensure that accurate measurements are obtained even if the scene in the field of view of the visible light camera 104*a* and the IR camera 104*b* has changed, for example due to a movement of the smart sensor device 102. In this case, if the smart sensor device 102 has moved or tilted, the newly captured visible image 116*a* will properly align with the IR images 116*b* to accurately identify pixels of the IR image 116*b* that correspond to the one or more objects of interest detected in the visible image 116*a*.

The sensor analytics system 114 of the smart sensor device 102 may be configured to perform analysis of one or more of i) the visible images 116*a*, ii) the IR images 116*b* and iii) the temperature values obtained from the IR images 116*b*. In an embodiment, the sensor analytics system 114 is configured to implement a machine learning technique (e.g., pattern seeking) to discover patterns in sets of the visible images 116*a* and/or the IR images 116*b*. To implement the machine learning technique, in an embodiment, the sensor analytics system 114 may perform dimensionality reduction to determine principal components or most unique information in visible images 116*a* in a set of visible images 116*a* and/or IR images 116*b*, for example. Dimensionality reduction may be performed using principal component analysis (PCA) of the visible images 116*a*, in an embodiment. In other embodiments, other suitable dimensionality reduction methods may be utilized in addition to or instead of PCA. The sensor analytics system 114 may run clustering algorithms on the principal components of the dimensionally reduced images to identify clusters of images that share particular characteristics. For example, the sensor analytics system 114 may implement k-means clustering to cluster images that share particular characteristics. In other embodiments, the sensor analytics system 114 may additionally or alternatively implement suitable clustering techniques other than k-mean clustering to cluster images that share particular characteristics.

The sensor analytics system 114 may also assign new incoming visible images 116*a* and/or the IR images 116*b* to particular ones of the clusters of images when particular characteristics of the new incoming visible images 116*a* and/or the IR images 116*b* match the particular characteristics shared by the images in the particular ones of the clusters of images. If an incoming image does not belong to any of the identified clusters of images, the sensor analytics system 114 may raise an alarm indicating that an abnormal image has been detected. Raising an alarm may include, for example, causing an alarm signal to be transmitted to the smart sensor device 102 to a user device. In some embodiments, prior to raising the alarm, the sensor analytics system 114 may determine whether the new incoming image corresponds to a new condition or new mode of operation that has not yet been seen by the sensor analytics system 114. For example, the sensor analytics system 114 may determine that the new incoming image corresponds to "a rainy day" mode of operation whereas the current clusters do not include a cluster associated with rainy day operation. If the sensor analytics system 114 determines that the new incoming image corresponds to a new condition or new mode of operation that has not yet been seen by the sensor analytics system 114, the sensor analytics system 114 may create a new cluster corresponding to the rainy day mode of operation, and may place the new incoming image in the new cluster rather than raising the alarm.

Referring still to FIG. 1, the system 100 may include a server device 124 and/or one or more user devices 126. The smart sensor device 102 may include an interface 150 for communicatively coupling the smart sensor device 102 to the server device 124 and/or the one or more user devices 126 via a communication network 128. The communication network 128 may be a wide area network (WAN) such as the Internet, a local area network (LAN), or any other suitable type of network. The communication network 128 may be single network or may be made up of multiple different networks, in some embodiments. The system 100 may include a database 140, in some embodiments. The database 140 may be communicatively coupled to the smart sensor device 102, the server device 124 and/or to the one or more user devices 126 via the network 128, as illustrated in FIG. 1, or may be coupled to the smart sensor device 102, the server device 124 and/or to the one or more user devices 126 in other suitable manners. For example, the database 140 may be directly connected to the server device 124, or may be included as part of the server device 124, in some embodiments. The database 140 may be a single database or may include multiple different databases. The user devices 126 may include, for example, personal computers, cellular phones, smart phones, and other suitable web-enabled devices.

The server device 124 is illustrated in FIG. 1 as including a processor 130 and a computer readable memory 132 that stores instructions executable by the processor 130. The computer readable memory 132 may store a server-side sensor data processing system 134. The computer readable memory 132 may include volatile memory to store computer instructions, such as Random Access Memory (RAM), and may also include persistent, for example, a hard disk, hard-drive or any other stable storage space, e.g. a secure digital ("SD"), a flash drive, etc. In some embodiments, the server device 124 includes multiple processors 130. Further, in some embodiments, the server-side sensor data processing system 134 may be implemented using hardware components, firmware components, software components, or any combination thereof. The smart sensor device 102 may be configured to transmit, via the interface 150 and the communication network 128, one or more of i) at least some of the visible images 116*a* captured by the visible light camera 104*a*, ii) at least some of the IR images 116*b* captured by the IR camera 104*b*, iii) at least some of the composite images depicting a visible image 116*a* overlaid with an IR image 116*b*, and iv) at least some temperature values obtained from the IR images 116*b* to the server device 124 for processing by the server-side sensor analytics system 134 and/or to the database 140 for storage. In some embodiments, the smart sensor device 102 may be configured to transmit only limited amount of information to the server device 124. For example, the smart sensor device 102 may transmit only images and temperature values based on which abnormalities are detected. As another example, the smart sensor device 102 may transmit only temperature values determined based on the images and not transmit the actual images. Transmitting only limited information may be more efficient and may provide better security as compared to systems that transmit more information, such as all obtained image information, in some embodiments.

The server-side sensor analytics system 134 may implement some or all of the sensor data analytics functionality of the sensor analytics system 114. Additionally or alternatively, the server-side sensor analytics system 134 may be configured to implement additional sensor data analytics functionality not implemented by the sensor analytics system 114. For example, the server-side sensor analytics system 134 may generate trend data that captures thermal conditions of the one or more objects of interest over time. The functionality of the sensor analytics application 114 that is implemented by the server-side sensor analytics system 134 may be omitted from the sensor analytics system 114, in some embodiments. In an embodiment, the server-side sensor analytics system 134 may implement all of the sensor analytics functionality supported by the system 100 and the sensor analytics system 114 may be entirely omitted from the smart sensor device 102.

The one or more user devices 126 may be utilized by users to monitor results provided by the smart sensor device 102 and/or server device 124. For example, the one or more user devices 126 may receive alert signals transmitted by the smart sensor device 102 and/or server device 124 via the communication network 128. An alert received by a user device 126 from the smart sensor device 102 or server device 124 may indicate that an alert has been raised by the smart sensor device 102 or server device 124 and may include additional information, such as type of alert, what condition caused the alert, etc. The alert signal may be in the form of an e-mail, a text message (e.g., a short message service (SMS) message), or may be in any other suitable form. The one or more user devices 126 may additionally or alternatively receive monitoring and/or trending information transmitted by the smart sensor device 102 and/or server device 124 via the communication network 128. The monitoring and/or trending information may include, for example, one or more of i) a visible image 116a captured by the visible light camera 104a, ii) an IR image 116b captured by the IR camera 104b and iii) a composite image that includes a visible image 116a overlaid with an IR image 116b, iv) temperature values obtained from the IR images 116b, v) trending data generated based on the temperature values obtained from the IR images 116b, etc. The user device 126 may display the monitoring and/or trending information, in some form, to a user to allow the user to remotely monitor thermal conditions of the one or more objects of interest in the scene.

Figure 2:
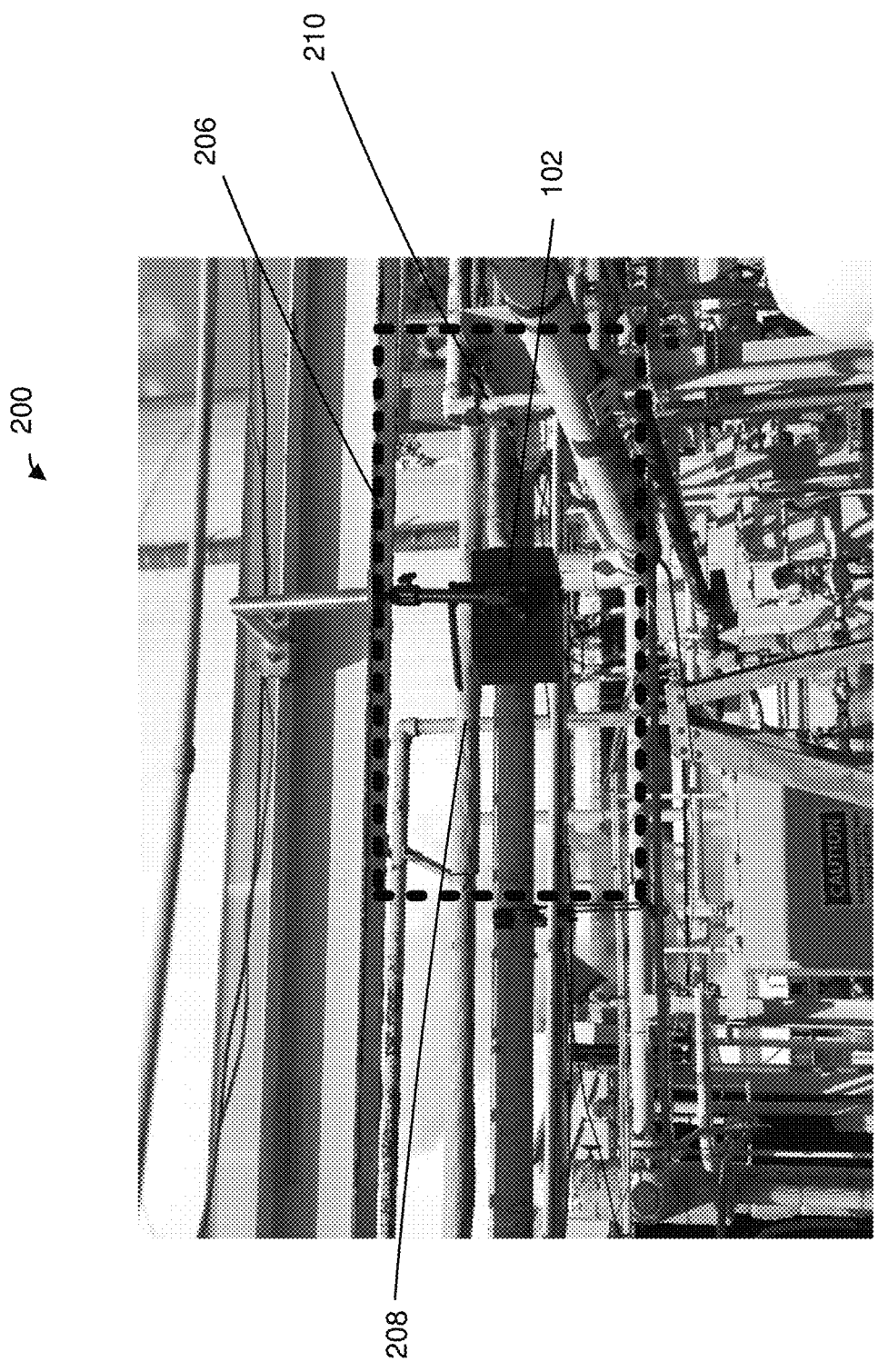
FIG. 2 is a diagram illustrating an example environment in which the sensor device of FIG. 1 may be utilized, according to an embodiment.

Referring now to FIG. 2, the smart sensor device 102 may be installed at a gas pipeline 200, and may be configured to obtain temperature measurement data for one or more objects in a scene 206 that may include a portion of the gas pipeline 200. In an embodiment, the scene 206 may be a portion of the gas pipeline 200 that is in a common field of view of the visible light camera 104a and the IR camera 104b of the smart sensor device 102. The one or more objects of interest in the scene 206, may include, for example, a first pipe 208 and a second pipe 210. Although the scene 206 is illustrated in FIG. 2 as including two objects of interest, the scene 206 includes other numbers (e.g., 3, 4, 5, 6, etc.) of objects of interest, in some embodiments. In an embodiment, the scene 206 includes a single object of interest. The first pipe 208 and the second pipe 210 in the scene 206 may have different surface characteristics and may, therefore, have corresponding different emissivity values. As an example, the first pipe 208 may be a metallic pipe having a shiny metal surface that may have relatively low emissivity, whereas the second pipe 210 may be a metallic pipe having a rusted surface that may have relatively high emissivity, in an example embodiment.

The sensor data processing system 112 of the smart sensor device 102 may process a visible image 116a of the scene 206 to automatically detect the first pipe 208 and the second pipe 210 in the visible image 116a, and to automatically classify the first pipe 208 as a shiny metallic pipe and the second pipe 210 as a rusted metallic pipe. Based on the classification of the first pipe 208 as a shiny metallic pipe and the second pipe 210 as a rusted metallic pipe, the sensor data processing system 112 may determine respective appropriate conversion functions for converting, to temperature values, values of pixels in respective regions of interest, corresponding to the first pipe 208 and the second pipe 210 in the scene 206, in an IR image 116b of the scene 206. For example, the sensor data processing system 112 may retrieve, from a memory (e.g., the memory 110 or another suitable memory), a first calibration file that specifies a first conversion function corresponding to the emissivity of the shiny metallic surface of the first pipe 208. The sensor data processing system 112 may also may retrieve, from the memory (e.g., the memory 110 or the other suitable memory), a second calibration file that specifies a second conversion function corresponding to the emissivity of the rusty metallic surface of the second pipe 210. In an embodiment, the first calibration file and the second calibration file are generated specifically for, respectively, the first pipe 208 and the second pipe 210 based on temperature measurements that were taken on the first pipe 208 and the second pipe 210 during installation and/or initial calibration of the smart sensor device 102. In other embodiments, the first calibration file and the second calibration file are generated in other suitable manners. For example, the first calibration file and the second calibration file may be generic calibration files corresponding, respectively, to emissivity of a shiny metallic surface and emissivity of a rusty metallic surface. Such generic files may be preloaded in the memory of the smart sensor device 102 during factory manufacture of the smart sensor device 102, for example.

With continued reference to FIG. 2, the sensor data processing system 112 may overlay the visible image 116a of the scene 206 with the IR image 116b of the scene 206, to identify respective regions in the IR image 116b corresponding to the first pipe 208 and the second pipe 210 detected in the visible image 116a. For example, the sensor data processing system 112 may utilize image registration to align the visible image 116a with the IR image 116b and to determine a mapping between pixels corresponding to the first pipe 208 and the second pipe 210 detected in the visible image 116a and corresponding pixels in the IR image 116b. Based on the mapping of the pixels in the visible image 116a and the corresponding pixels in the IR image 106b, the sensor data processing system 112 may convert values of the pixels corresponding to the first pipe 208 in the IR image 116b to temperature values using the first conversion function specified in the first calibration file retrieved from the memory based on surface characteristics of the first pipe 208. Similarly, the sensor data processing system 112 may also convert values of the pixels corresponding to the second pipe 210 in the IR image 116b to temperature values using the second conversion function specified in the second calibration file retrieved from the memory based on the surface characteristics of the second pipe 210. Accordingly, a specific conversion function, identified based on detection and classification of a particular object (e.g., first pipe 208, second pipe 210) in the visible image 116a, is used to obtain temperature values from pixel values corresponding to the particular object in the IR image 116b, in an embodiment. Further, different conversion functions, identified based on detection and classification of different objects (e.g., first pipe 208 and second pipe 210) in the visible image 116a may be used to obtain temperature values from pixel values corresponding to respective ones of the objects in the IR image 116b, in an embodiment.

Figure 3:
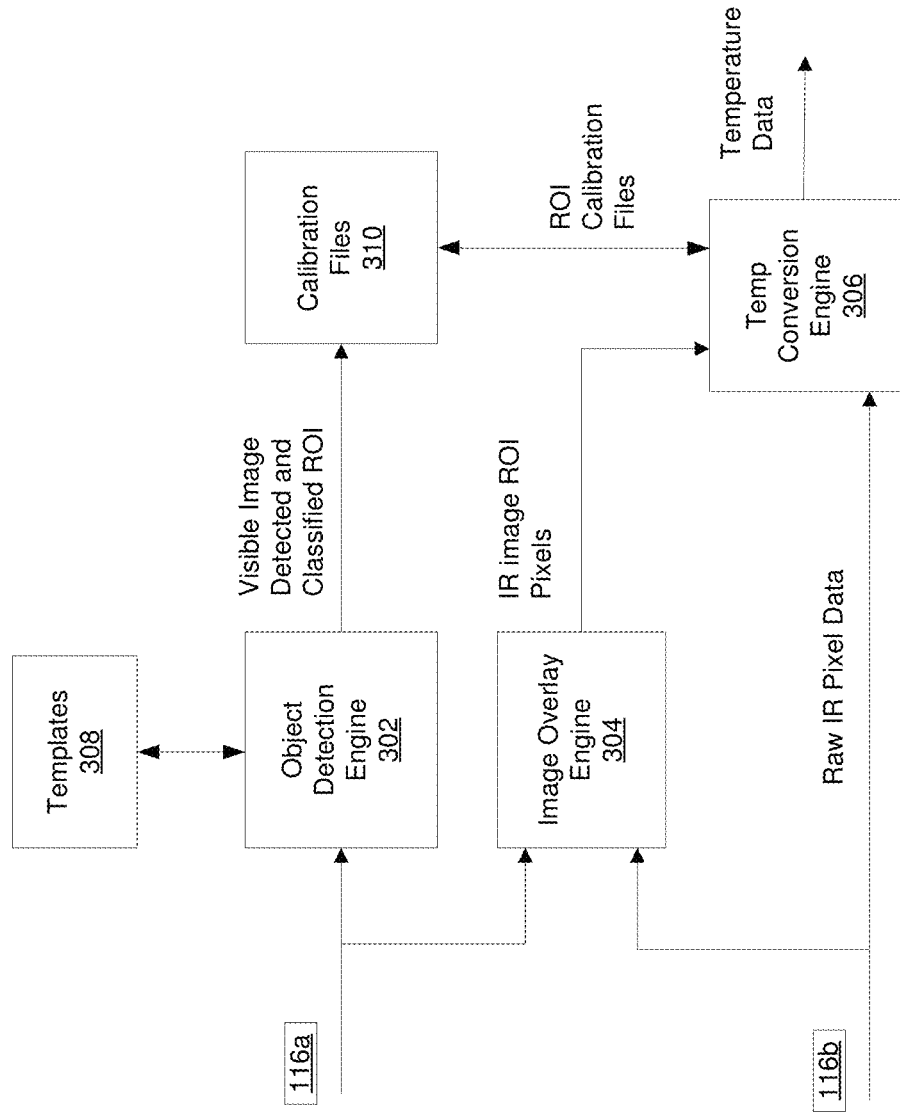
FIG. 3 is a block diagram of a sensor data processing system that may be utilized with the sensor device of FIG. 1, according to an embodiment.

FIG. 3 is a block diagram of a sensor data processing system 300, according to an embodiment. In an embodiment, the sensor data processing system 300 corresponds to the sensor data processing system 112 of the smart sensor device 102 of FIG. 1. In other embodiments, the sensor data processing system 112 of the smart sensor device 102 of FIG. 1 may be a suitable sensor data processing system different from the sensor data processing system 300. The sensor data processing system 300 may be configured to process images of a scene, such as the scene 206 of FIG. 2 or any other suitable scene. For ease of explanation, the sensor data processing system 300 is described with reference to the smart sensor device 102 of FIG. 1 and the scene 206 of FIG. 2. However, the sensor data processing system 300 is used with sensor devices different from the smart sensor device 102 of FIG. 1 and/or used to process images of scenes different from the scene 206 of FIG. 2, in some embodiments.

The sensor data processing system 300 may include an object detection engine 302, an image overlay engine 304 and a temperature conversion engine 306. The object detection engine 302 may process the visible image 116a of a scene (e.g., the scene 206 of FIG. 2) to detect one or more objects of interest in the visible image 116a. The one or more objects of interest that may be present in the visible image 116a may include one or more pipes or portions thereof, as is illustrated in FIG. 2, and/or may include other objects of interest, such as a valve or a portion thereof, a motor or a portion thereof, etc. Any suitable object detection method may be utilized by the object detection engine 302 to detect the one or more objects of interest in the visible image 116a. For example, the object detection engine 302 may utilize template matching to detect the one or more objects of interest in the visible image 116a, in an embodiment. In this embodiment, the object detection engine 302 may utilize one or several template images that may be stored in a memory 308 coupled to the object detection engine 302. The template images stored in the memory 308 may include template images of known objects that are expected to be present in the scene. For example, template images stored in the memory 308 may include a first template image capturing the first pipe 208 and a second template image capturing the second pipe 210. The template images may be generated during in-field setup of the smart sensor device 102, in an embodiment. For example, the visible light camera 104a of the smart sensor device 102, or another suitable visible light camera, may be used to capture images of the one or more objects of interest in the scene, and the captured images of the one or more objects of interest in the scene may be stored in the memory 308 for subsequent use as template images during operation of the smart sensor device 102. In other embodiments, the template images may be generated in other suitable manners. For example, generic template images of objects expected to be in the scene may be preloaded into the memory 308 during manufacture of the smart sensor device 102. The object detection engine 302 may retrieve the one or more template images from the memory 308, and may run the one or more template images retrieved from the memory 308 across the visible image 116a to identify best-matching regions the visible image 116a. The object detection engine 302 may identify respective sets of pixels in the visible image 116a that best match respective ones of the image templates capturing particular objects, and may generate an output mapping that may indicate the identified pixels and tags or labels that identify the pixels as belonging to the particular objects.

As another example, the object detection engine 302 may comprise one or more neural networks, such as a convolutional neural networks (CNN) or another suitable type of neural network, that may be trained to recognize certain objects that may potentially be present in the scene. Using such one or more neural networks may allow the object detection engine 302 to detect the one or more objects of interest in the scene without previous knowledge about the scene. The object detection engine 302 may identify respective sets of pixels in the visible image 116a that correspond to the recognized one or more objects in the image 116a, and may generate an output mapping that may indicate the identified pixels and tags or labels that identify the pixels as belonging to the particular objects detected in the visible image 116a.

In other embodiments, other suitable object detection techniques may be utilized to detect the one or more objects of interest in the visible image 116a. For example, any suitable combination of one or more of i) image recognition, ii) image segmentation, iii) template matching, iv) object detection using machine learning, such as object detection using neural networks (e.g., CNNs, deep learning neural networks, etc.) etc. may be utilized to detect the one or more objects of interest in the visible image 116a.

The object detection engine 302 may assign respective tags or labels to the one or more objects of interest detected in the image 116a that indicate surface characteristics of the objects of interest detected in the image 116a. In an embodiment, for example, the object detection engine 302 may generate an output mapping that may associate identified pixels in the visible image 116a with corresponding tags or labels that identify the pixels as belonging to the particular objects detected in the visible image 116a having the particular surface characteristics. Thus, for example, the object detection engine 302 may generate a mapping that may associate pixels identified as belonging to the first pipe 208 in the scene 206 with a tag or label that indicates that the pixels belong to a shiny metallic pipe. Similarly, the object detection engine 302 may generate a mapping that may associate pixels identified as belonging to the second pipe 210 in the scene 206 with a tag or label that indicates that the pixels belong to a rusted metallic pipe.

The image overlay engine 304 may process the visible image 116a and the IR image 116b to overlay the visible image 116a with the IR image 116b to generate a composite image and to identify pixels in the IR image 116b that correspond to the detected one or more objects in the visible image 116a. For example, the image overlay engine 304 may utilize an image registration technique to overlay the visible image 116a with the IR image 116b. In an embodiment, the image overlay engine 304 may utilize an image registration technique that is based on long-distance integrated parallel vision model. The long-distance integrated parallel vision model may apply, for example, in an embodiment in which i) the visible light camera 104a and the infrared camera 104b are positioned in the smart sensor device 102 such that the focal axis of the visible image 116a is parallel to the focal axis of the infrared camera 104b and ii) the smart sensor device 102 is positioned at a suitably long distance from the target scene. Under the long-distance integrated parallel vision model, overlaying the visible image 116a with the IR image 116b may be performed via scale transformation and translation transformation between the visible image 116a with the IR image 116b. The image overlay engine 304 may perform the scale transformation based on a ratio between respective focal lengths of the visible light camera 104a and the infrared camera 104b. In an embodiment, the scale transformation may zoom into the visible image 116a to make the scale of the visible image 116a match the scale of the IR image 116b. The translation transformation may determine a mapping between pixels of the zoomed-in visible image 116a and corresponding pixels of the IR image 116b, and may thereby identify regions of interest in the IR image 116b corresponding to the objects of interest that were detected in the visible image 116a. In other embodiments, the image overlay engine 304 may utilize other suitable techniques to overlay the visible image 116a with the IR image 116b, and to determine a mapping between pixels of the zoomed-in visible image 116a and corresponding pixels of the IR image 116b.

The image overlay engine 304 may further analyze mapping of the pixels to ensure that the pixels of the IR image 116b mapped to the pixels of the visible image 116a at the edges of the objects of interest detected in the visible image 116a do not actually lie outside of the corresponding regions of interest in the IR image 116b. The image overlay engine 304 may determine that one or more particular pixels mapped onto a region of interest in the IR image 116b actually lie outside the corresponding region of interest detected in the visible image 116a. Determination that one or more particular pixels mapped onto a region of interest in the IR image 116b actually lie outside the corresponding region of interest detected in the visible image 116a may signify that the one or more pixels in the IR image 116b do not belong to the object of interest detected in the image 116a. In response to determining that one or more particular pixels mapped into a region of interest in the IR image 116b actually lie outside the corresponding region of interest detected in the visible image 116a, the image overlay engine 304 may discard the one or more particular pixels from the region of interest in the IR image 116b, in an embodiment.

With continued reference to FIG. 3, based on the labels assigned by the object detection engine 302 to the respective one or more objects of interest detected in the visible image 116a, the sensor data processing system 300 may retrieve, from a memory 310, respective one or more calibration files that specify respective conversion functions to be used for converting, to temperature values, values of the pixels of the IR image 116b mapped by the image overlay engine 304 to the pixels that belong to the corresponding objects of interest in the visible image 116a. The memory 310 may store multiple calibration files, respective ones of the multiple calibration files associated with different surface characteristics. For example, the memory 310 may store a first calibration file associated with a shiny metallic surface, a second calibration file associated with a rusted metallic surface, a third calibration file associated with a plastic surface, etc. The sensor data processing system 300 may retrieve, from the memory 310, appropriate one or more calibration files based on the tags or labels assigned to the respective one or more objects of interest by the object detection engine 302.

The appropriate one or more calibration files retrieved from the memory 310 may be provided to the temperature conversion engine 306. Using the respective conversion functions specified in the appropriate one or more calibration files retrieved from the memory 310, the temperature conversion engine 306 may convert, to temperature values, values of the pixels of the IR image 116b mapped by the image overlay engine 304 to the pixels of the corresponding regions of interest of the visible image 116a. Accordingly, the temperature conversion may be performed by the temperature conversion engine 306 to obtain temperature values for the one or more target objects in the IR image 116b using the appropriate temperature conversion functions that reflect the specific emissivity of each of the one or more objects of interest detected in the visible image 116a. Converting values pixels in the IR image 116b corresponding to the one or more objects of interest detected in the visible image 116a to temperature values using respective conversion functions that reflect the respective emissivity values of the corresponding one or more objects results, in at least some embodiments, in more accurate temperature values determined for the regions of interest as compared to temperature values determined assuming a same generic emissivity value for all of the regions of interest. Moreover, identifying specific pixels in the IR image 116b corresponding to the one or more objects of interest detected in the visible image 116a allows the sensor data processing system 300 to precisely isolate those pixels in the IR image 116b that correspond to a particular object of interest detected in the visible image 116a, further improving accuracy of temperature measurements provided by the sensor data processing system 300, in at least some embodiments.

Figure 4:
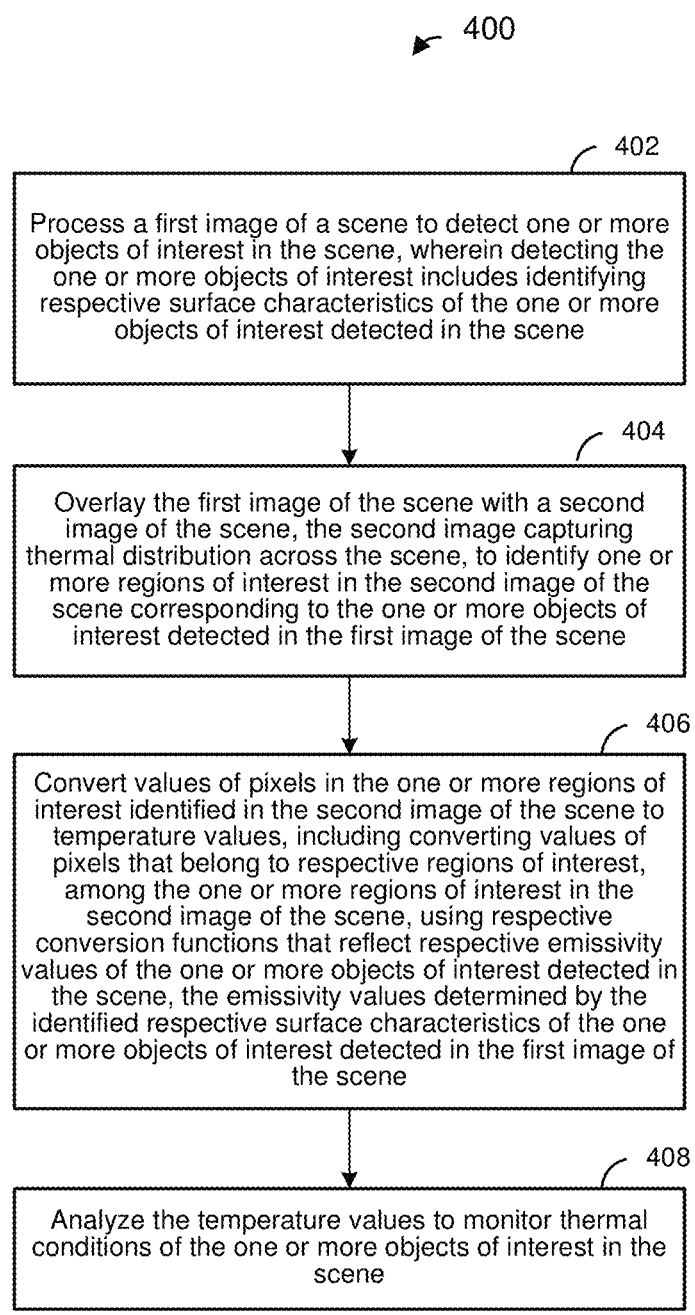
FIG. 4 is a flow diagram of a method for processing thermal image data in the sensor device of FIG. 1, according to an embodiment.

FIG. 4 is a flow diagram of a method 400 for processing thermal image data in a sensor device, according to an embodiment. In an embodiment, the method 400 is implemented by the smart sensor device 102 of FIG. 1. For example, the method 400 is implemented by the computing system 106 of the smart sensor device 102 of FIG. 1, in an embodiment. In other embodiments, the method 400 is implemented by suitable components the smart sensor device 102 of FIG. 1 different from the computing system 106, or is implemented by a suitable sensor device different from the smart sensor device 102 of FIG. 1.

At block 402, a first image of a scene is processed to detect one or more objects of interest in the scene. In an embodiment, the sensor data processing system 112 of the smart sensor device 102 may process the first image at block 402. In an embodiment, the object detection engine 302 of FIG. 3 may process the first image at block 402. The first image of the scene may be a visible image capturing the scene. Detection of the one or more objects of interest in the scene may be performed using template matching, using a neural network (e.g., CNN) trained to detect the one or more objects of interest, etc. Detecting the one or more objects of interest in the scene may include identifying respective surface characteristics of the one or more objects of interest detected in the scene. For example, detecting the one or more objects of interest may include detecting a first object of interest as having a shiny metallic surface, detecting a second object of interest as having a rusted metallic surface, detecting a third object of interest as having a plastic surface, etc.

At block 404, the first image of the scene is overlaid with a second image of the scene. In an embodiment, the sensor data processing system 112 of the smart sensor device 102 may overlay the first image with the second image at block 404. In an embodiment, the image overlay engine 304 may overlay the first image with the second image at block 404. The second image may be an IR image that captures thermal distribution across the scene. Overlaying the first image with the second image may include identifying one or more regions of interest in the second image corresponding to the one or more objects of interest detected at block 402 in the first image. Overlaying the first image with the second image may also include generating a composite image showing the first image overlaid with the second image.

At block 406, values of pixels in the one or more regions of interest identified in the second image of the scene are converted to temperature values. In an embodiment, the sensor data processing system 112 of the smart sensor device 102 may convert the values of pixels in the one or more regions of interest identified in the second image to temperature values at block 406. In an embodiment, the temperature conversion engine 306 of FIG. 3 may convert the values of pixels in the one or more regions of interest identified in the second image to temperature values at block 406. Block 406 may include converting values of pixels that belong to respective regions of interest, among the one or more regions of interest in the second image identified at block 404, using respective conversion functions that reflect respective emissivity values of the one or more objects of interest detected in the scene. The emissivity values may be determined by the respective surface characteristics of the one or more objects of interest detected in the first image at block 402.

At block 408, the temperature values obtained at block 406 are analyzed to monitor thermal conditions of the one or more objects of interest in the scene. In an embodiment, the sensor analytics system 114 of the smart sensor device 102 may at least partially analyze the temperature values at block 408. Additionally or alternatively, the server-side sensor analytics system 134 may at least partially analyze the temperature values at block 408. Analyzing the temperature values at block 406 may include, for example, generating trending data based on the temperature values to show thermal conditions of the one or more objects of interest over time, detecting that particular temperature values are abnormal, generating alarms to alert users of detected abnormalities, etc., in various embodiments.

Figure 5:
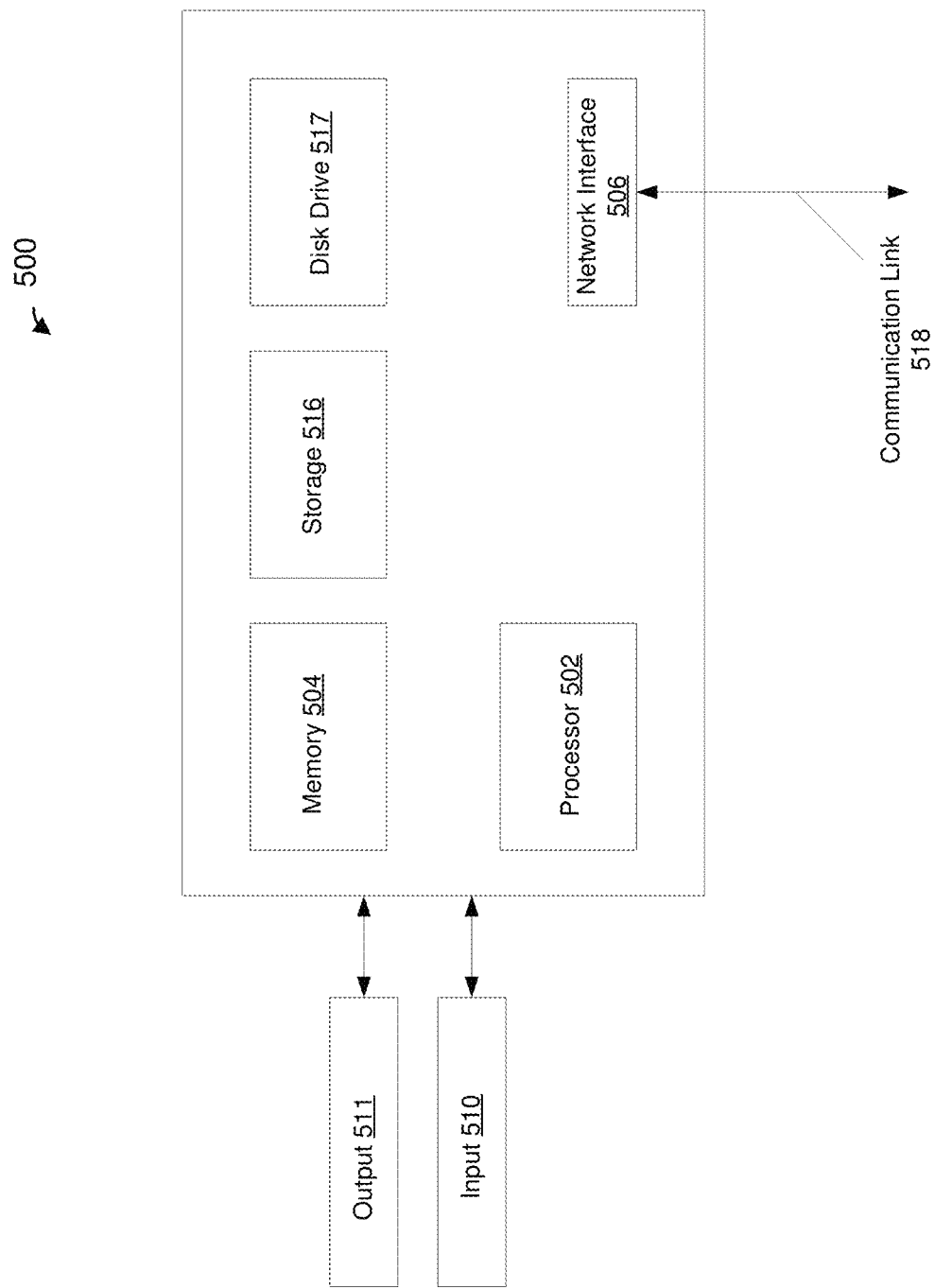
FIG. 5 is a block diagram of a computer system suitable for implementing one or more components of the system of FIG. 1, according to an embodiment.

FIG. 5 is a block diagram of a computing system 500 suitable for implementing one or more embodiments of the present disclosure. In its most basic configuration, the computing system 500 may include at least one processor 502 and at least one memory 504. The computing device 500 may also include a bus (not shown) or other communication mechanism for communicating information data, signals, and information between various components of computer system 500. Components may include an input component 510 that processes a user action, such as selecting keys from a keypad/keyboard, selecting one or more buttons or links, etc., and sends a corresponding signal to the at least one processor 502. Components may also include an output component, such as a display, 511 that may display, for example, results of operations performed by the at least one processor 502. A transceiver or network interface 506 may transmit and receive signals between computer system 500 and other devices, such as user devices that may utilize results of processes implemented by the computer system 500. In one embodiment, the transmission is wireless, although other transmission mediums and methods may also be suitable.

The at least one processor 502, which can be a microcontroller, digital signal processor (DSP), or other processing component, processes these various signals, such as for display on computer system 500 or transmission to other devices via a communication link 518. The at least one processor 502 may also control transmission of information, such as cookies or IP addresses, to other devices. The at least one processor 502 may execute computer readable instructions stored in the memory 504. The computer readable instructions, when executed by the at least one processor 502, may cause the at least one processor 502 to implement processes associated with video frame processing and/or recognition of a subject based on a plurality of video frames.

Components of computer system 500 may also include at least one static storage component 516 (e.g., ROM) and/or at least one disk drive 517. Computer system 500 may perform specific operations by processor 512 and other components by executing one or more sequences of instructions contained in system the memory 504. Logic may be encoded in a computer readable medium, which may refer to any medium that participates in providing instructions to the at least one processor 502 for execution. Such a medium may take many forms, including but not limited to, non-transitory media, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations have been described herein in terms of "modules" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

The invention claimed is:

1. A method for processing thermal image data in a sensor device, the method comprising:
   processing, with a processor of the sensor device, a first image of a scene to detect one or more objects of interest in the scene, wherein detecting the one or more objects of interest includes identifying respective surface characteristics of the one or more objects of interest detected in the scene;

overlaying, with the processor of the sensor device, the first image of the scene with a second image of the scene, the second image capturing thermal distribution across the scene, to identify one or more regions of interest in the second image of the scene corresponding to the one or more objects of interest detected in the first image of the scene;

converting, with the processor of the sensor device, values of pixels in the one or more regions of interest identified in the second image of the scene to temperature values, including converting values of pixels that belong to respective regions of interest, among the one or more regions of interest in the second image of the scene, using respective conversion functions that reflect respective emissivity values of the one or more objects of interest detected in the first image scene, the emissivity values determined by the identified respective surface characteristics of the one or more objects of interest detected in the first image of the scene; and analyzing, with the processor of the sensor device, the temperature values to monitor thermal conditions of the one or more objects of interest in the scene.

2. The method of claim 1, wherein processing the first image of the scene comprises using template matching to detect the one or more objects of interest in the first image of the scene, including matching a template image of a particular object of interest in the scene across the first image to identify a matching region in the first image.

3. The method of claim 1, wherein processing the first image comprises using a neural network trained to detect the one or more objects of interest in the scene.

4. The method of claim 1, further comprising retrieving, from a memory, respective calibration files specifying the respective conversion functions that reflect respective emissivity values of the one or more objects of interest detected in the scene, the respective calibration files being retrieved based on the identified respective surface characteristics of the one or more objects of interest detected in the scene.

5. The method of claim 4, wherein
processing the first image includes detecting at least i) a first object of interest in the scene, the first object of interest having first surface characteristics and ii) a second object of interest in the scene, the second object of interest having second surface characteristics different from the first surface characteristics, and retrieving the respective calibration files includes i) retrieving a first calibration file specifying a first conversion function that is based on a first emissivity value corresponding to the first object of interest and ii) retrieving a second calibration file specifying a second conversion function that reflects a second emissivity value of the second object of interest, the second emissivity value being different from the first emissivity value.

6. The method of claim 1, further comprising transmitting the temperature values from the sensor device via a communication network to a server device for further processing.

7. The method of claim 1, wherein
the first image of the scene is a visible image captured by a visible light camera, and
the second image of the scene is an infrared (IR) image captured by an IR camera.

8. A sensor device, comprising
a first camera configured to capture a first image of a scene,
a second camera configured to capture a second image of the scene, the second image capturing thermal distribution across the scene, and
a processor coupled to the first camera and the second camera, the processor configured to
process the first image of the scene to detect one or more objects of interest in the scene, wherein detecting the one or more objects of interest includes identifying respective surface characteristics of the one or more objects of interest detected in the scene;
overlay the first image of the scene with the second image of the scene to identify one or more regions of interest in the second image of the scene corresponding to the one or more objects of interest detected in the first image of the scene;
convert values of pixels in the one or more regions of interest identified in the second image of the scene to temperature values, including converting values of pixels that belong to respective regions of interest, among the one or more regions of interest in the second image of the scene, using respective conversion functions that reflect respective emissivity values of the one or more objects of interest detected in the first image scene, the emissivity values determined by the identified respective surface characteristics of the one or more objects of interest detected in the first image of the scene; and
analyze the temperature values to monitor thermal conditions of the one or more objects of interest in the scene.

9. The sensor device of claim 8, wherein the processor is configured to process the first image of the scene using template matching to detect the one or more objects of interest in the scene, the processor being configured to match a template image of a particular object of interest in the scene across the first image to identify a matching region in the first image.

10. The sensor device of claim 8, wherein the processor is configured to process the first image comprises using a neural network trained to detect the one or more objects of interest in the scene.

11. The sensor device of claim 8, wherein the processor is further configured to retrieve, from a memory, respective calibration files specifying the respective conversion functions that reflect respective emissivity values of the one or more objects of interest detected in the scene, the respective calibration files being retrieved based on the identified respective surface characteristics of the one or more objects of interest detected in the scene.

12. The sensor device of claim 11, wherein the processor is configured to
process the first image to detect at least i) a first object of interest in the scene, the first object of interest having first surface characteristics and ii) a second object of interest in the scene, the second object of interest having second surface characteristics different from the first surface characteristics,
retrieve, from the memory, a first calibration file specifying a first conversion function that is based on a first emissivity value corresponding to the first object of interest, and
retrieve, from the memory, a second calibration file specifying a second conversion function that reflects a second emissivity value of the second object of interest, the second emissivity value being different from the first emissivity value.

13. The sensor device of claim 8, wherein the processor is further configured to cause the temperature values to be transmitted from the sensor device via a communication network to a server device for further processing.

14. The sensor device of claim 8, wherein
the first camera is a visible light camera, and
the second camera is an infrared camera.

15. A system, comprising
a server device application configured to process thermal data, and
a sensor device coupled to the server device component via a communication network, the sensor device comprising
a first camera configured to capture a first image of a scene,
a second camera configured to capture a second image of the scene, and
a processor coupled to the first camera and the second camera, the processor configured to
process the first image of the scene to detect one or more objects of interest in the scene, wherein detecting the one or more objects of interest includes identifying respective surface characteristics of the one or more objects of interest detected in the scene,
overlay the first image of the scene with the second image of the scene to identify one or more regions of interest in the second image of the scene corresponding to the one or more objects of interest detected in the first image of the scene,
convert values of pixels in the one or more regions of interest identified in the second image of the scene to temperature values, including converting values of pixels that belong to respective regions of interest, among the one or more regions of interest in the second image of the scene, using respective conversion functions that reflect respective emissivity values of the one or more objects of interest detected in the first image scene, the emissivity values determined by the identified respective surface characteristics of the one or more objects of interest detected in the first image of the scene, and
cause the temperature values to be transmitted via the communication network to the server device application for further processing.

16. The system of claim 15, wherein the processor of the sensor device is to configured to process the first image of the scene using template matching to detect the one or more objects of interest in the scene, the processor being configured to match a template image of a particular object of interest in the scene across the first image to identify a matching region in the first image.

17. The system of claim 15, wherein the processor of the sensor device is configured to configured to process the first image comprises using a neural network trained to detect the one or more objects of interest in the scene.

18. The system of claim 15, wherein the processor of the sensor device is further configured to retrieve, from a memory, respective calibration files specifying the respective conversion functions that reflect respective emissivity values of the one or more objects of interest detected in the scene, the respective calibration files being retrieved based on the identified respective surface characteristics of the one or more objects of interest detected in the scene.

19. The system of claim 15, wherein the sensor device is further configured to cause one or both of the first image and the second image to be transmitted via the network to the server device application.

20. The system of claim 15, wherein the server device application is configured to cause one or more of i) the temperature values, ii) the first image and iii) the second image to be displayed to a user.

* * * * *